July 14, 1931.  H. E. ALTGELT  1,814,814
HARROW
Original Filed Dec. 11, 1924
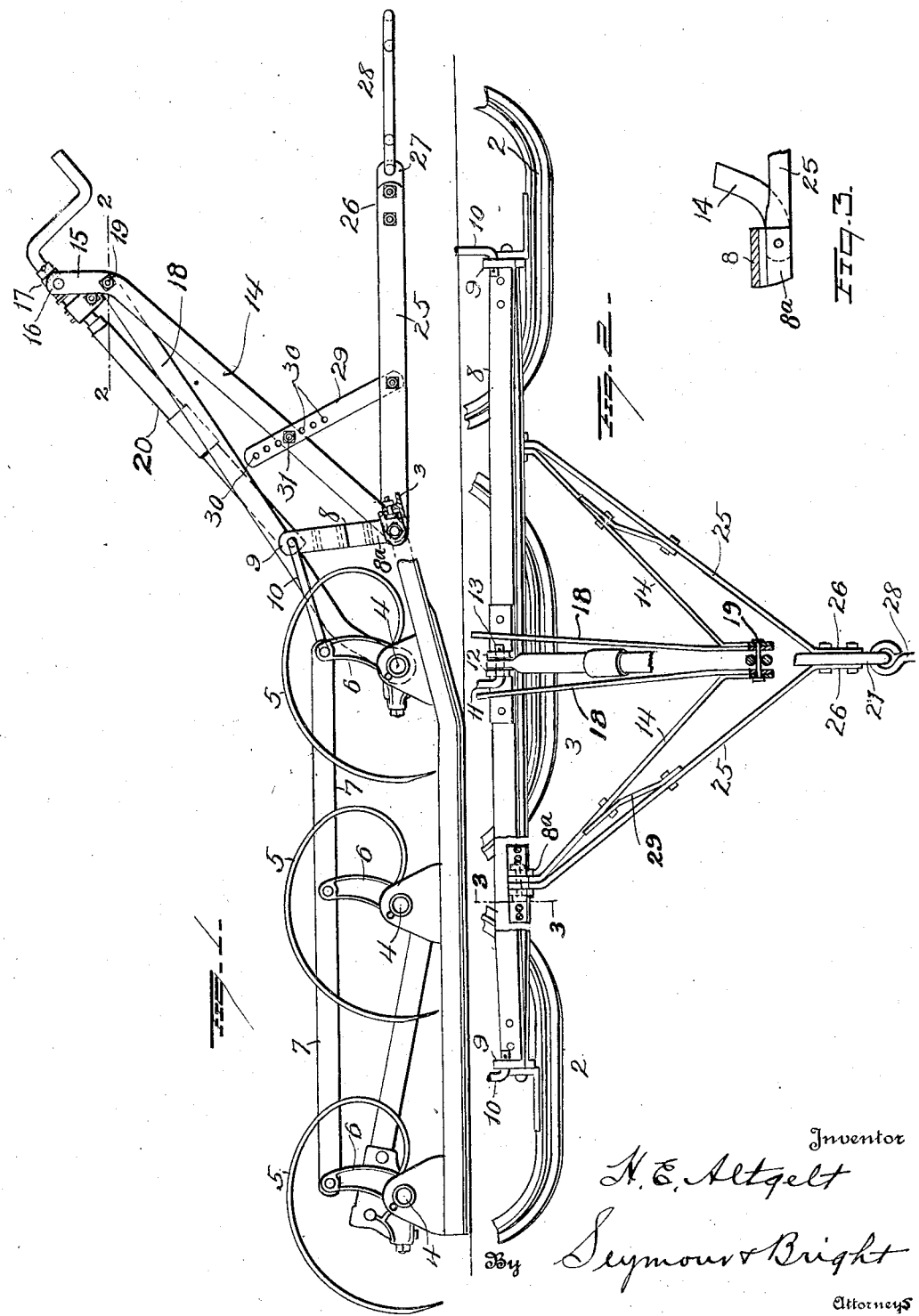

Patented July 14, 1931

1,814,814

UNITED STATES PATENT OFFICE

HERMAN E. ALTGELT, OF SOUTH BEND, INDIANA, ASSIGNOR, BY MESNE ASSIGNMENTS, TO OLIVER FARM EQUIPMENT COMPANY, A CORPORATION OF DELAWARE

HARROW

Original application filed December 11, 1924, Serial No. 755,236. Divided and this application filed July 23, 1925. Serial No. 45,555.

This invention relates to improvements in harrows,—the same being a division of application for patent now issued under No. 1,703,051, dated Feb. 19, 1929.

One object of my present invention is to obviate the difficulty heretofore experienced with harrows that have a low hitch to a tractor, of the tendency of the harrow to "run on the nose".

A further object is to provide means, in a harrow, which will cause the latter to work "on an even keel", and in which the draw bars shall be held fixed normally but be so adjustable vertically that they may be set in such position relatively to the harrow and the tractor as to cause the front teeth of the harrow to penetrate the earth to greater depth than the rear teeth, or so that the rear teeth may be caused to do more work than the front teeth.

With these and other objects in view, the invention consists in certain novel features of construction and combinations of parts as hereinafter set forth and pointed out in the claims.

In the accompanying drawings:

Fig. 1 is a side elevational view of my improved harrow with certain portions thereof broken away for the purpose of illustration.

Fig. 2 is a top plan view of a portion of the same taken on a cross sectional line indicated by the line 2—2 of Fig. 1 (only the forward portion of the harrow is shown in Fig. 2).

Fig. 3 is a cross sectional view taken on the line 3—3 in Fig. 2.

In the embodiment of the invention shown in the drawings, the harrow is shown as comprising a plurality of units 2, 2 and 3 which in practice are arranged side by side and flexibly connected together and the frame of each unit supports a plurality of transverse shafts 4 carrying harrow teeth 5 and having arms 6 connected by rods 7. all as fully shown and described in my patent hereinbefore identified. The forward ends of the frame units 2, 2 and 3 are inclined upwardly and forwardly, and have pivotally attached thereto a draft appliance in the manner hereinafter described.

Near the forward end of the harrow a cross bar 8 is located and its lower portion has pivotal connection with the respective harrow units, upwardly projecting arms 9 at respective ends of said cross bar being connected by links 10 with the arms 6 on the shafts 4 of the side cultivator units 2, 2, as shown in Fig. 1. The corresponding arm of the central unit 3 is connected by a link 11 with spaced lugs 12 on the central portion of the cross bar 8,—the end portion of said link which passes through said lugs constituting a pin 13, all as indicated in Fig. 2 and as shown and described in my previously mentioned patent.

Inclined bars or standards 14 are hinged or pivotally connected at their lower ends with brackets 8a on the under side of the transverse bar or beam 8,—the pivotal connections between said bars or standards and the rocking bar or beam being approximately in horizontal alignment with the pivotal connections between said rocking bar or beam and the frames of the harrow units. From their connection with the rocking bar or beam 8, the bars or standards 14 project forwardly and upwardly and also inwardly toward each other, so that their upper, approximately vertical portions 15 will be suitably spaced apart to receive and provide a pivot mounting 16 for a sleeve 17. To properly support the bars or standards 14, braces 18 are provided, the upper forward ends of the latter being attached by a bolt 19 to the upper portions of said bars or standards and the rear, lower portions being loosely connected with the forward shaft 4 of the intermediate unit (see Fig. 1), the loose connection being such as not to interfere with the proper turning of said shaft.

The sleeve 17 forms the main support for a screw shaft mechanism, the operation of which effects rocking of the bar 8, said mechanism constituting the subject-matter of Patent No. 1,618,677 issued to Ernest W. Richards and Ernest J. Janso.

It is apparent that when the screw shaft is turned by the operator, motion will be imparted, to the rocking bar or beam 8, and that the shafts 4 of the several harrow units will be turned to raise or lower the points or working ends of the harrow teeth.

Heretofore, with spring tooth harrows having a low hitch connection with a tractor, there has been a tendency for the harrow to run on the nose which means that the front teeth will enter the ground too much while the rear teeth will not penetrate the ground enough if at all. To overcome such objectionable operation of a spring tooth harrow, the draft devices will have rigid connection with the cross bar or beam of the structure, but provision is made to permit vertical adjustment so that the depth of penetration of the front and rear teeth relatively to each other can be controlled. To these ends, draft bars 25 are attached to brackets 8a on the underside of the cross bar or beam 8 and, converging forwardly, terminate in parallel portions 26 between which, a draw bar block 27 is adjustably bolted. This block is connected with a tractor through the medium of a draft link 28. Braces 29 are pivoted to the draft bars 25 and connect the latter with the bars 14 in a manner to support the draft bars in rigid positions. The braces are provided with series of holes 30 for the accommodation of connecting bolts 31 so that the connection of the braces 29 with the bars 14 may be adjusted to adjust the draft bars in vertical planes.

By means of the draw-bar arrangement above described, the harrow can be adjusted so that the front spring teeth can be made to penetrate the ground to greater depth than the rear teeth by setting the front end of the draft bars high, or the front ends of the draft bars may be set low and thus cause the rear teeth to do more work than the front ones. In other words, either a down pressure can be brought to bear on the front end of the harrow by setting the front ends of the draft bars high, or an up-pull may be effected by setting the front ends of the draft bars low, and furthermore, the harrow will be prevented from running on the nose.

Various slight changes might be made in the details of construction of the invention without departing from the spirit of the latter or limiting its scope and hence I do not restrict myself to the precise details herein set forth.

Having fully described my invention what I claim as new and desire to secure by Letters-Patent, is:—

1. In a spring tooth harrow, the combination with a frame and spring teeth carried thereby, said frame including an upwardly and forwardly projecting portion, of draft means pivotally connected with the frame adjacent the upper and forward ends of said upwardly and forwardly projecting portion, adjustable means between said upwardly and forwardly projecting portion of the frame and said draft means, said adjustable means normally holding said draft means rigid, and link means attached to the forward end of said draft means.

2. In a spring tooth harrow, the combination of a frame member, front and rear spring harrow teeth supported thereby, a transverse rocking bar mounted on the frame member, draft bars pivotally connected to the rocking bar, and devices supported on the frame member and the rocking bar and overhanging the draft bars to secure the draft bars in a set vertical angular relation to the frame member, said devices including adjustable means whereby the depth of penetration of the front and rear teeth may be relatively adjusted.

3. In a spring tooth harrow, the combination of a frame member, spring harrow teeth supported thereby, a transverse rocking bar mounted on the frame member, draft bars connected to the rocking bar and movable in vertical planes relative to the frame member, standards carried by and extending upwardly and forwardly from the rocking bar, adjusting means carried by said standards and connected with said rocking bar for adjusting the harrow teeth and adjustable braces secured to and extending between the standards and the draft bars, and link hitch means attached to the forward ends of said draft bars.

4. In a spring tooth harrow, the combination of a harrow frame, spring harrow teeth supported thereby, draft bars pivotally connected with the frame, standards pivotally connected at their lower ends with the frame and extending upwardly and outwardly therefrom, means extending from the frame for supporting the upper ends of the standards, adjustable braces attached to and extending between the draft bars and the standards, and link hitch means connected with the forward ends of said draft bars.

5. A spring tooth harrow comprising a frame carrying rock shafts upon which spring harrow teeth are secured, a transverse rocking bar at the front end of the frame, link connections between said rocking bar and the rock shafts, draft bars attached to the under side of said bar and converging forwardly therefrom in an approximately horizontal plane of the rock shafts, a draft device secured to the front ends of the draft bars, upwardly and forwardly converging standards pivoted at their lower ends to the rocking bar in common with the draft bars, braces pivoted at their lower ends to the respective draft bars and adjustably secured to the respective standards, and upper braces rigidly secured at their front ends to the upper end portions of the standards and having their lower ends pivotally mounted on the frame at the rear of the rocking bar.

In testimony whereof, I have signed this specification.

HERMAN E. ALTGELT.